INVENTOR.
WILLIAM C. TRETHEWEY
BY
Staelin & Overman
ATTORNEYS

INVENTOR.
WILLIAM C. TRETHEWEY
BY
Staelin & Overman
ATTORNEYS

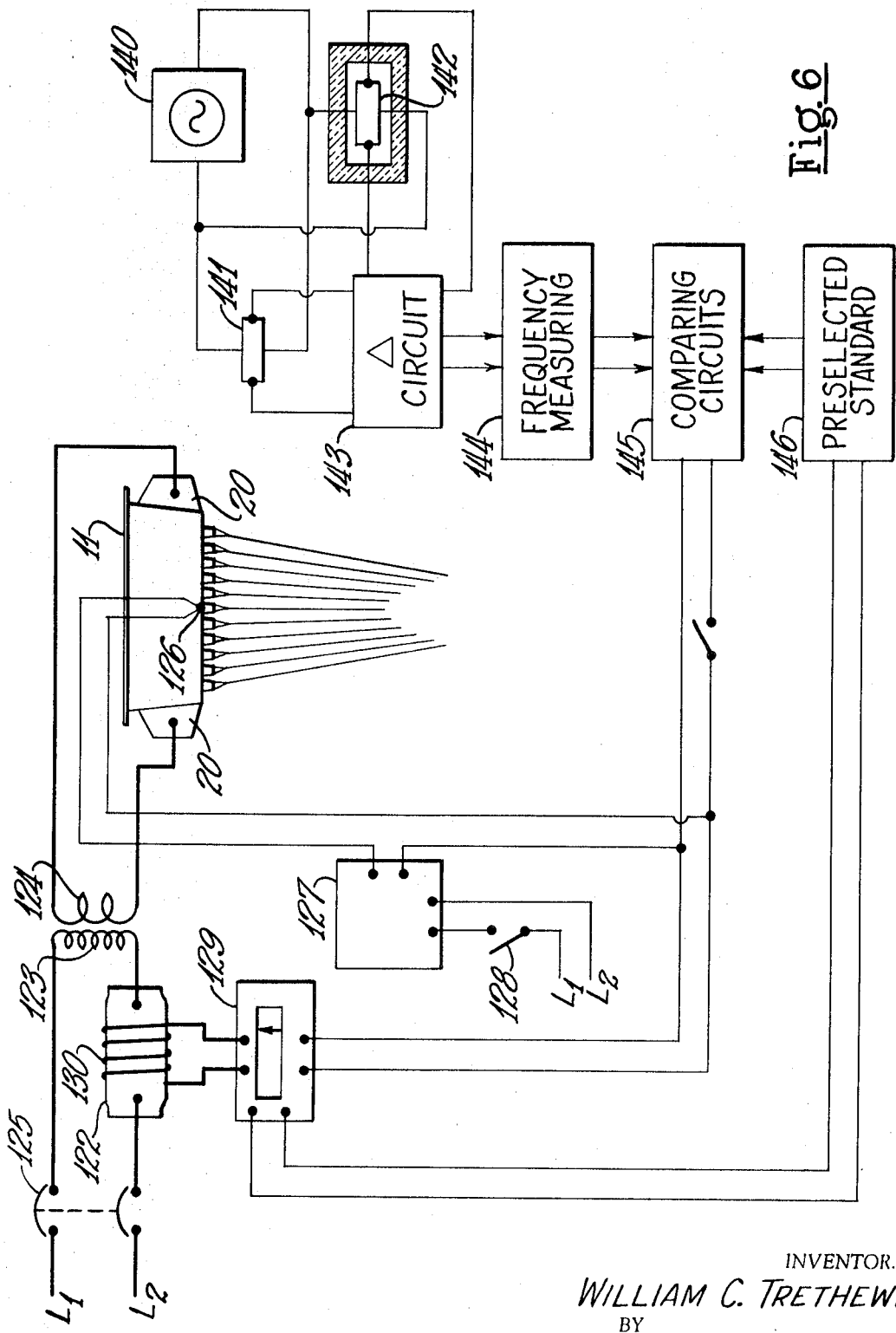

United States Patent Office 3,582,298
Patented June 1, 1971

3,582,298
FREQUENCY MEASURING APPARATUS FOR CONTROLLING THE TEMPERATURE OF A GLASS FIBER FORMING APPARATUS
William C. Trethewey, Newark, Ohio, assignor to Owens-Corning Fiberglas Corporation
Original application Nov. 3, 1966, Ser. No. 591,906, now Patent No. 3,467,325, dated Sept. 16, 1969. Divided and this application Apr. 7, 1969, Ser. No. 832,528
Int. Cl. C03b 37/02
U.S. Cl. 65—11    3 Claims

ABSTRACT OF THE DISCLOSURE

This invention relates to an apparatus for issuing streams of molten glass to be attenuated into fibers. The temperature of the molten glass is sensd by a device generating a frequency signal which varies in proportion to temperature variation of the molten glass. A known period of the cyclic variation of the frequency signal is selected and a counter counts a predetermined higher frequency rate during the known period to provide a measure of the temperature of the glass. The amount of heat supplied to the glass is controlled in response to the output of the counter.

---

This is a division of co-pending application Ser. No. 591,906, filed Nov. 3, 1966, now Pat. 3,467,325, granted Sept. 16, 1969.

This invention relates generally to frequency measuring apparatus and more particularly to the use of such frequency measuring apparatus in condition sensing apparatus which may be utilized for sensing a variable condition and controlling the variable condition. Further, the inventive concept is particularly applicable in fiber producing apparatus.

As the instrumentation approach in measurement and control of variables, apparatus, and processes has grown more sophisticated, the requirements for accuracy in such instrumentation approaches have also increased to provide a closer quality check on the goods being produced and on the processes being used. More sensitive frequency measuring apparatus and the novel inventive concepts that spring from the use of more sensitive frequency measuring devices lead to better products and processes. For example, it is well known that thermoplastic materials such as glass can be drawn into continuous fibers by attenuation of streams from a feeder associated with a molten body of this material. The flowing material is attenuated in the process into individual fibers which are usually gathered into a strand under the influence of pulling forces exerted by a winder which collects the strand into a package. The strand in such instances is usually wound on a collection tube mounted on a rotating collet of the winder and may be collected at linear speeds in the order of 15,000 to 20,000 feet per minute or more.

In manufacturing fibers in this manner, the goal has been to produce fibers which are closely similar in diameter and individual fibers of uniform diameter throughout their lengths. If production of fibers of such uniformity could be attained, the strand yardage per pound of glass supplied from the feeder would be consistently uniform and much would be done to promote consumer reliance upon the product quality when strand or fiber diameters are specified.

On collection of strands into a package, however, a gradual build-up of the package occurs in the usual packaging cycle of, for example, six to thirty minutes, such that for a given speed of the collection tube, the linear speed of attenuation is in effect gradually and substantially uniformly increased to a maximum linear speed toward the end of the packaging cycle. In other words, at the start of a packaging cycle, the linear speed of attenuation of the fiber from the feeder is determined by the outer diameter of the bare collection tube, but as the build-up of the package occurs, the speed of attenuation instead becomes dependent upon the outer diameter of the top layers of strand in the package. When viewed on an over-all basis, the linear speed of attenuation increases gradually from a minimum at the beginning of a packaging cycle to a maximum at the end of a packaging cycle when the package is completed. Under fixed conditions of temperature of the glass supplied from the feeder, the diameter of fibers collected into the strands being wound is correspondingly undesirably diminished because of this increase in speed. Consequently, the yardage per unit weight of glass being collected also varied dependent upon whether it is collected at the beginning or the end of the package.

It has been discovered that when one of the fiber-forming factors such as the temperature of the thermoplastic material emitted from the feeder or the rotational speed of the winder which collects the strand into a package is programmed or varied at a patterned rate matched to the variation in linear speed of attenuation, that the fiber diameter can be maintained more exactingly uniform. When utilizing such variable conditions as control factors, such as glass temperature or winding speed, it then becomes incumbent upon the control apparatus to do so with the highest degree of accuracy possible in order to attain the best results.

Accordingly, it is an object of this invention to provide improved frequency measuring apparatus which is adapted to provide readout indications of the frequency or other variable conditions being measured, and which is also adapted to provide a signal which is a measure of the variable condition and which can be utilized to correct a programmed variation of the condition.

It is a further object of this invention to provide condition sensing apparatus which may be utilized to control the apparatus providing the variable condition.

A still further object of this invention is to provide fiber producing apparatus in which a variable condition is being controlled by a programmed approach, which condition may be sensed and the sensing results utilized to correct the preselected programmed approach.

In effecting the above objects the invention features frequency measuring apparatus which comprises means for sampling a frequency signal to be measured, means for selecting a predetermined period of the sampled frequency signal, and counter means responsive to the selecting means which is adapted to count at a predetermined frequency during the selected period of the sampled frequency. The counting frequency is higher than the frequency of the signals being measured and thus the total count accumulated by the counter at the end of a selected period is a measure of the frequency. The selecting means may include means responsive to a reversal in polarity of the frequency being measured. The apparatus may further include means for selecting a second predetermined period of the sampled frequency signal. The counter means may be made responsive to the second selecting means and operative to count during the second selective period. Means may then be utilized for comparing the total counts in the first-mentioned and the second periods to determine the accuracy of the frequency measuring apparatus, or whether the first count represented a full predetermined period.

The invention also features condition sensing and controlling apparatus which comprises means for sensing a variable condition and generating a frequency signal in which the frequency varies in proportion to the variation of the condition being sensed. Such apparatus includes means for selecting a predetermined period of the frequency signal and counter means responsive to the selecting means adapted to count at a predetermined frequency during the selected period of the sensed frequency. As above, the counting frequency is higher than the frequency of the frequency signal being measured, the frequency count being a measure of the variable condition being sensed. As examples of variable conditions that may be sensed and/or controlled, there are illustrated herein embodiments sensing the speed of the winder collecting fibers onto a package, the temperature of a feeder containing molten thermoplastic materials, fluid flow, particle flow, and pressure. In order to control the variable conditions, means may be utilized for comparing the sensed frequency count with a preselected standard and means responsive to the comparing means may be utilized for altering the variable condition, whether altering a preselected programmed approach or altering directly the variation of the condition.

Specifically, the invention is illustrated in detail in fiber producing apparatus which comprises means for supplying a plurality of streams of molten fiber-forming material, a winder collet for attenuating the streams into continuous fibers and for collecting said fibers into a package and motor means for rotationally driving the collet.

If the fiber producing apparatus includes motor control means having means for generating frequency signals to regulate the speed of the motor means, variable driving means connected to drive the frequency generating means, and means for providing preselected programmed auxiliary signals matched to the build-up rate of the package on the collet to vary the connection of the variable driving means to the frequency generating means, then there may be utilized means for sensing and measuring the frequency generated by the frequency generating means. By comparing the measured frequency with a frequency standard desired at the time of sensing measuring, a signal is produced for correcting the auxiliary signals in accordance with the results of the frequency comparison.

If, on the other hand, the fiber producing apparatus includes a temperature measuring device in a control means arranged to supply signals to regulate a heating means for the feeder means to maintain a given temperature of a molten body in the feeder means, then means may be utilized for supplying programmed auxiliary signals to the control means for variation of the temperature of the molten body at a rate matched to variations in the rate of attenuation of the streams in response to package build-up. In this instance, means for sensing the temperature of the molten body and generating a frequency signal in which the frequency of the signal varies in proportion to the variation of the temperature being sensed may be used. The frequency signal may be measured, preferably by a counter means as described hereinbefore which is responsive to a selecting means adapted to select a predetermined period of the signal. The measured frequency may be compared with a preselected standard and means may be utilized which are responsive to the comparing means for effecting correction of the control means or the preselected auxiliary programmed signal supplying means.

Other objects, advantages and features of this invention will become apparent when the following description is taken in conjunction with the accompanying drawings, in which:

FIG. 6 is a block diagram illustration of a circuit which may be used for control of the electrical current supplied to the feeder of the apparatus of FIGS. 1 and 2;

Although the invention is herein exemplified in specific detail by reference to glass fiber production, it will be apparent in view of the disclosure that it has application to production of fibers of other materials as well. Further, although the variable conditions shown as subjects of measurement and control are specific uses of the invention herein disclosed, it is to be noted that all embodiments are illustrative only and not limiting in any sense with respect to apparatus, process, product or other use of the invention as disclosed herein.

Figure 1:
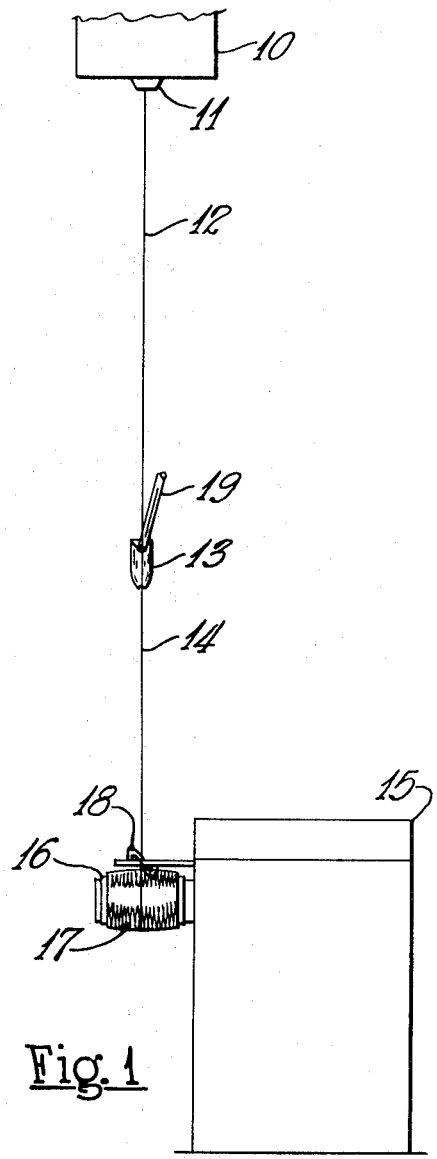
FIG. 1 shows a general layout of apparatus for producing continuous glass fibers.
Figure 2:
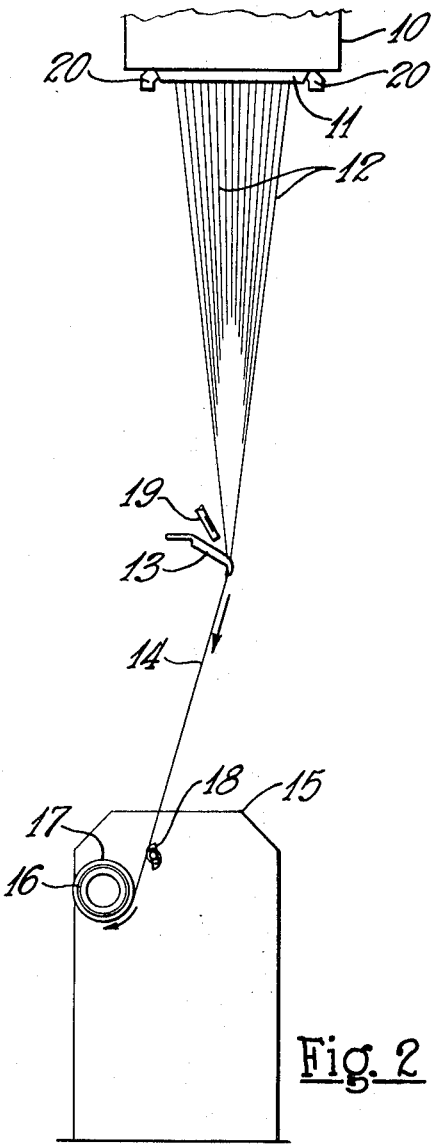
FIG. 2 is a front elevational view of the general layout of apparatus shown in FIG. 1.

Turning to the drawings in greater detail, the general layout of strand forming and winding apparatus of FIGS. 1 and 2 is utilized to show the most specific application of the invention. FIGS. 1 and 2 include a source of molten glass, such as a melting unit 10, having an associated electrical feeder or bushing 11 from which streams of molten glass flow. The feeder has a plurality of aligned orifices of small dimensions which form the streams from which the filaments or fibers 12 are then drawn. The feeder is made of high-temperature conducting material such as platinum and is provided with terminals 20 at opposite ends thereof across which a potential is applied to supply current of magnitude sufficient to heat it to the desired attenuating temperature for the glass.

The force of withdrawal of fibers 12 from the material emerging from the feeder 11 is provided by winding apparatus such as a collet-type winder 15 which winds the strand 14 formed of the fibers 12 onto a collection or packaging tube 16 in the form of a generally cylindrical package 17. The fibers 12 are usually gathered together by a size-applying and gathering apparatus 13 at a point intermedite the packaging tube 16 and the feeder 11. Sizing fluid may be supplied to the gathering apparatus 13 from an external source, not shown, through a tube 19 disposed above the gathering apparatus. After formation, the strand 14 is caused to traverse the collection tube 16 by a spiral wire traverse 18 of the winder 15.

Figure 3:
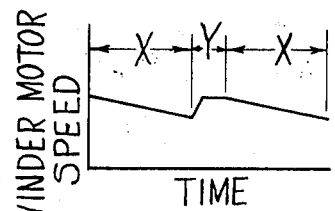
FIG. 3 illustrates in graphic form the winding motor speed-time characteristics that are desirable for optimum fiber diameter control.

FIG. 3 illustrates graphically a ramp or slope function, or in other words, the stepped manner by which the winder motor speed may be varied with respect to time to effectively provide fiber uniformity throughout a packaging cycle X. Each step of winder speed variation is matched to a packaging cycle X. At the beginning of a cycle X, the rotational speed of the winder motor and collet is at a maximum, while during the cycle X the winder speed is gradually diminished to a minimum which will compensate for the predetermined linear speed of the strand and fibers due to build-up of the package. During the period Y on the graph, the completed package may be doffed and another collection tube installed on the collet, or on more advanced winding mechanisms another collet may be indexed into collecting position. During the period Y, the winder speed may be returned to its initial value at the beginning of a packaging cycle preparatory to the start of another packaging cycle. The change in winder speed during period Y can be easily effected before the packaging cycle is ready to begin again.

Figure 4:
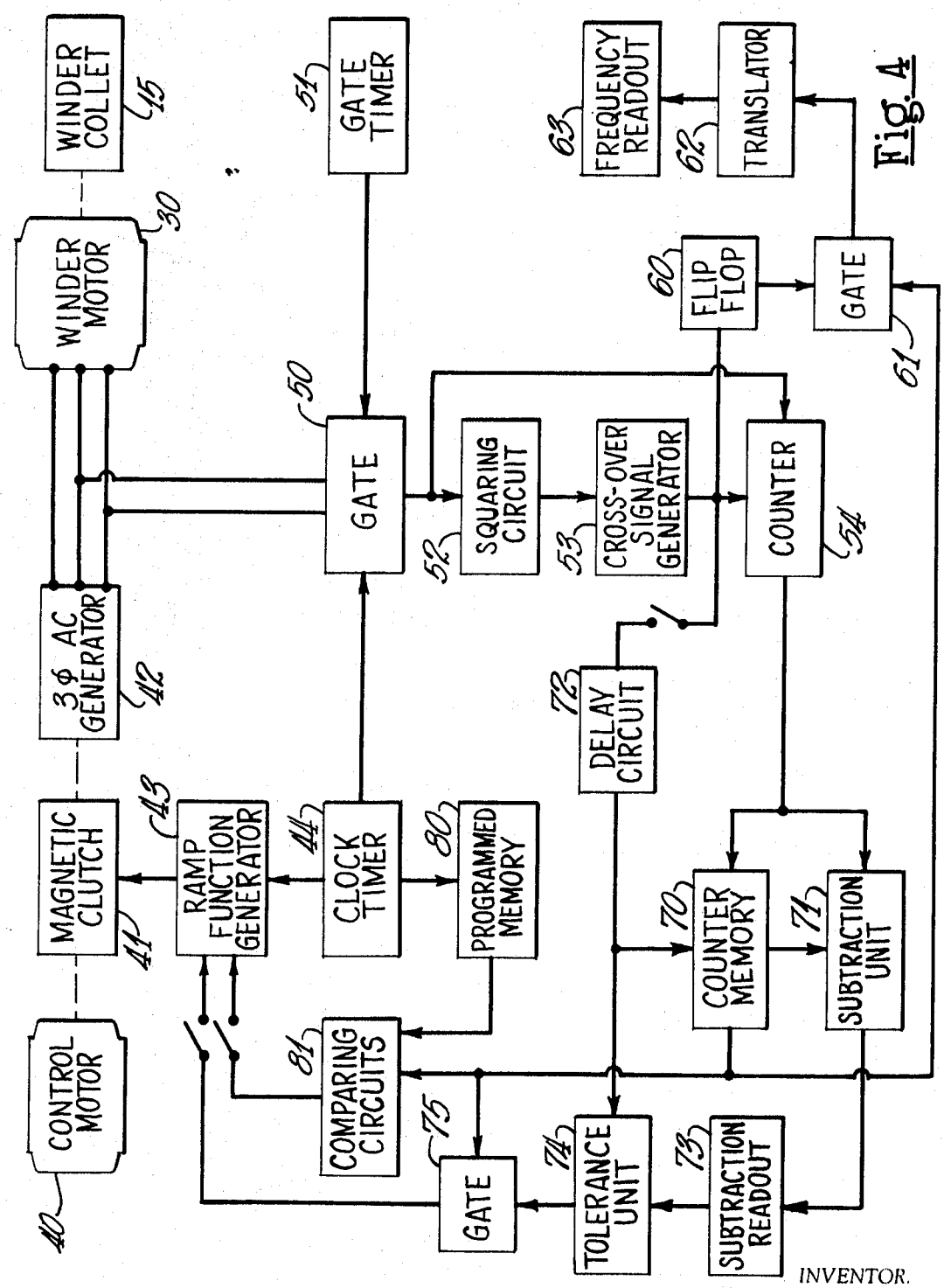
FIG. 4 is a block diagram illustration of a circuit which may be used for control of winder motor speed in collecting the fibers onto a package.

FIG. 4 shows an arrangement adapted to provide uniform fiber diameters by attenuation of a plurality of fibers at a constant linear speed from a feeder. The constant linear speed of attenuation is attained in this instance by programming the speed of the winder motor 30 in accordance with the rate of build-up of the package being wound on winder collet 15.

The winder collet 15 is driven by the winder motor 30, which for the purposes of this embodiment may be a frequency responsive, variable speed motor. Motor speed control means includes a control motor 40 driving a three phase A.C. generator 42 via a magnetic clutch 41, and a ramp function generator 43 controlling the magnetic clutch connection between the control motor 40 and the three phase generator 42. For the purposes of this embodiment, the control motor 40 is preferably a constant speed synchronous motor. The magnetic clutch 41 is advantageously adjustable in slip in response to preselected programmed signals from the ramp function generator 43. The ramp function generator provides programmed signals to effect ramp function control of the winder motor as shown in FIG. 3.

To insure that the winder motor 30 is being driven at the desired speed, there is provided frequency sensing and measuring means for supplying frequency signals corresponding to the speed of the motor. The frequency generated by the A.C. generator 42 is sampled by a gate 50. The gate 50 may be made responsive to pass the sample signal by receipt of signals from a clock timer 44, which may also control the action of the ramp function generator 43, and a gate timer 51.

A signal from the clock timer 44 will indicate that the speed of the winder motor 30 is actually being controlled at that time by the ramp function generator 43. The clock timer 44 may also be set to provide a gating signal at the beginning and/or end of a packaging cycle, at predetermined intervals within the packaging cycle, or throughout the packaging cycle.

The gate timer 51 may be used to provide a predetermined sampling period. Gate timers may be used at a plurality of stations so that the same frequency measuring apparatus may be time-shared by the plurality of stations. That is, a master gate timer with a plurality of outputs may be arranged to successively open gates for sampled signals from a plurality of stations to the frequency measuring apparatus. Similarly, a plurality of gate timers with single outputs may be set to successively open gates connected with different stations. The gate timer 51 may be set to hold the gate "open" for a predetermined period. In this embodiment the gate timer would preferably be set to hold the gate "open" for a minimum of one and one-half cycles of the frequency being measured. Normally, signals from the clock timer and the gate timer must occur simultaneously to "open" the gate 50.

A counter means 54 is provided which has a count frequency rate that is relatively high compared to the frequency being measured. For example, a counter frequency within a digital computer may be on the order of four megacycles per second. The counter is allowed to count for a predetermined period or a portion of a cycle of the frequency being measured. The accumulated or total count at the end of this predetermined period or portion of the cycle is a measure of the frequency being sampled, since the count is a measure of time consumed by that period or the portion of the cycle. If the counter frequency is four megacycles and the frequency being measured is one hundred twenty cycles per second, then the counter would accumulate a total of 332,000 counts in a cycle. Therefore, if a counter did accumulate the above total for a cycle, then it would be known that the frequency of the sample being measured was one hundred twenty cycles per second. Similarly, if the counter accumulated half the above total in half a cycle, then the frequency would still be known to be one hundred twenty cycles per second. Other fractional ratios and multiples thereof or of whole cycles may similarly be used to provide a measure of the frequency being sampled.

In order to use the counting system, the apparatus must be operative to select a known portion or whole cycle or multiple of cycles of the frequency being measured. Means for selecting a predetermined period or a portion of a cycle in this embodiment include a squaring circuit 52, which receives the sample and converts it to a substantially square wave, and a cross-over signal generator, while a number of means may be used to mark the beginning and end of a predetermined period or of a portion of a cycle, one of the best suited for this invention is to utilize a circuit which derives a signal from a square wave as it reverses polarity (or crosses over the zero amplitude level) at the half-cycle mark. The half-cycle signal may be used as a pulse to reset the counter 54 and initiate a new counting cycle.

If a whole cycle, or multiples of the half cycle is desired as the portion or period for counting, the cross-over signal generator may include a combination of flip-flops or another counter so that a predetermined number of crossovers must occur before the "reset" pulse is applied to the main counter 54. The use of a number of crossovers to set the period for counting may be useful when the difference or ratio between the count frequency and the measured frequency is not so large.

The counter 54 may start accumulating a count from the start of its receipt of the measured frequency signal from the gate circuit 50 until the first reset signal is received from the cross-over generator 53. However, it is not known whether this constitutes the predetermined portion or period required for measurement.

To determine whether or not the correct predetermined period has elapsed, a number of approaches may be used. First, the counter 54 can be made responsive only to the cross-over of the frequency being measured. Thus, the counter would be responsive to read out only after a first reset signal is followed by a counting period and a second reset signal. This may be accomplished by placing a gate 61 between the output of a counter memory 70 receiving the output of the counter 54 and a translator 62 and frequency readout 63 section.

Gate 61 may be made to "open" in response to a first and second reset signals which are fed through a circuit such as a flip-flop 60 which passes only every other signal. The count stored in the counter memory 70 may then be passed through gate 61 to a translator 62 section which translates the accumulated count to the correct frequency, which frequency is then shown in the frequency readout 63. It would be desirable in this instance to provide the counter memory 70 with a delayed reset signal via delay circuit 72 from the cross-over generator 53 to clear the counter memory for the next measurement.

As a second method of determining whether the correct period has passed, a count accumulated in the counter 54 before a reset signal, is stored in the counter memory 70. The next count is then compared to the count stored in the memory 70, for example by a subtraction unit 71. If the counts are identical or within a predetermined tolerance, then the two periods of counting must have been substantially identical and the predetermined period requirement is satisfied. The accumulated count for either period or the total for both periods may then be used as an expression of the frequency being measured. If the counts are not identical or not within a tolerance, then the comparison of successive periods is continued until the counts are within the tolerance.

The need for a tolerance sometimes arises if the components in the squaring circuit 52 are such that the squaring circuit is unable to make the leading edges of the square waves sufficiently vertical. If a slope is left in the leading edge of the square wave, the timing of the read signals from the cross-over generator 53 may be slightly off.

Once the sampled frequency has been measured the result may be utilized to correct the signal supplied by the ramp function generator 43, if there is a variance from the desired frequency being supplied to the winder motor 30.

A first method of using the sampled frequency is to compare the sampled frequency from the counter memory 70 with a frequency supplied from a programmed memory 80. In this instance there is no requirement to convert the count in the counter memory 70 since the programmed memory may supply the comparison frequency in the form of a count. It will be noted that the programmed memory 80 may be controlled by the clock timer 44 controlling the ramp function generator 43 so that the comparison frequency issued by the programmed memory 80 is the correct one for that portion of the ramp function cycle. If the measured frequency and the programmed frequency counts are the same or within a tolerance, no correction signal is provided by the comparing circuit 81 to the ramp function generator 43. If there is a difference, a signal corresponding to the difference is supplied to the ramp function generator 43 to provide a correction in the control of the magnetic clutch 41.

A second method of using the sampled frequency is to provide a signal from the counter memory through a gate 75 directly to the ramp function generator 43 for internal comparison with a preselected program in the ramp function generator 43. Gate 75 may be "opened" to pass the signal from the counter memory 70 in response to a signal from a tolerance unit 74. The tolerance unit 74 provides the gating signal in response to a subtraction readout 73 from the subtraction unit 71 which is within the prescribed tolerance when successive periods of counting are being compared.

Other methods for comparing and correcting other than those set forth above may be utilized within the spirit and scope of this invention. The switches are shown in the various leads so that a particular method may be selected.

Since differences are calculated between successive periods, the circuit of FIG. 4 may also be used to measure the rate of change in a frequency being sensed.

Figure 5:
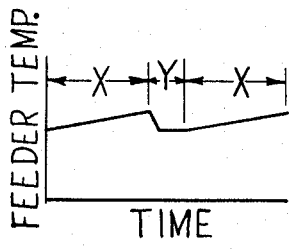
FIG. 5 illustrates in graphic form the desirable feeder temperature-time characteristics for optimum diameter control.

FIG. 5 illustrates graphically a ramp or slope function, or in other words, the stepped manner by which feeder temperature may be varied with respect to time to effectively provide fiber uniformity throughout the packaging cycle. Each step of temperature variation is matched to the packaging cycle X. At the beginning of the cycle X, the feeder temperature is at a minimum while during the cycle it is gradually increased to a maximum which will compensate for the increased speed due to build-up at the end of the cycle.

During the period Y in FIG. 5, while the package is being doffed and another collection tube is being installed on the collet (or on some winding mechanisms another collet is being indexed into place), the temperature of the feeder is reduced to its initial value at the beginning of the cycle preparatory to the start of another packaging cycle X. It has been found that this reduction in temperature can be effected in a period of very short duration by cutting back on current flow through the feeder. Because of the high temperature differential between the feeder and the surrounding atmosphere, the period required to effect temperature reduction is a matter of mere seconds and is sufficiently rapid not to be a retardent to start-up of a subsequent packaging cycle. In other words, the reduction in temperature can be effected with time to spare in the period usually required to provide a new collection tube for making a new package.

FIG. 6 shows an electrical power circuit and associated controls for supply of energy to heat the feeder 11. Broadly, the power circuit includes a saturable reactor 122 in series with a power transformer for the feeder. The feeder is connected by way of its terminals 20 across the secondary winding 124 of the power transformer while the primary of the winding 123 of the transformer is connected serially with the saturable reactor 122. The series circuit is connected to a suitable power line source L1, L2 such, for example, as a 440 volt, 60 cycle line through contacts 125 of a line circuit breaker and over a pair of suitably fuse-protected circuit leads.

Current regulating controls for the power circuit may be provided by conventional-type temperature-sensing and regulating unit 129, such as a unit of the type well known to the instrument trade as a Wheelco unit which can be arranged to operate in conjunction with a temperature-sensing thermocouple 126. This unit operates to sense the temperature of the feeder by way of the thermocouple 126 and to indicate the temperature signal at a meter provided with means for presetting the temperature desired. As the temperature signal fed to the unit varies from a preset value, the unit functions to supply a corrected signal to the power circuit by way of the saturable reactor to establish the current flow for the temperature desired. However, the regulating unit not only receives the signal from the thermocouple 126, but also an auxiliary signal corresponding in effect to a false temperature signal supplied by unit 127.

The saturable-core reactor 122 has an associated direct-current winding 130 which when energized builds up the flux concentration in the reactor in a characteristic manner according to its B-H curve. Energy for the D.C. winding 130 is supplied from the temperature regulating unit 129. When the flux concentration in the saturable-core reactor 122 is high on the B-H curve, such as at a point just below the knee of the curve, the inductive reactance of the reactor is at a minimum and the current supplied to the transformer by way of its primary is correspondingly at a maximum. When, however, the direct-current flow in the winding 130 is somewhat smaller, such that the flux concentration in the reactor dwells in the region of a point considerably below the knee of the curve, the inductive reactance of the reactor is more appreciable and the current flow in the transformer primary is accordingly lower. Thus, the amount of direct-current flowing in the winding 130 determines the magnitude of the reactance in series with the transformer and consequently determines the amount of electrical energy supplied to establish the temperature of feeder 11.

As indicated previously, it has been found that by causing a gradual increase in the temperature of the feeder as increases in speed of attenuation of fibers occur permits production of fibers of uniform diameter throughout each packaging cycle for each package wound. That is, as the speed of attenuation increase due to package build-up, a gradual increase in temperature of the feeder at a matched rate, results in establishment of compensating variations in the attenuating factors to permit production of fibers uniform in diameter within a very close tolerance. On viewing the operation more fundamentally, it appears that the progressive increase in temperature of the glass in actuality causes the glass to flow more freely from the feeder. Thus, more molten material is made available as the speed of attenuation increases to maintain the diameter of the glass fibers uniform.

The gradual build up of temperature can be accomplished by supplying a false temperature signal to the regulating unit 129 from the unit 127 along with the temperature signal supplied thereto by the thermocouple 126. The unit 127 is connected to the regulating unit 129 in series with the thermocouple and is arranged to oppose the thermocouple signal as it increases, to falsely indicate to the unit 129 that the temperature of the feeder is gradually diminishing. That is, the regulating unit receives a false temperature signal which causes it to allow the current flow through the feeder to gradually increase and consequently effect a gradual increase in temperature of the feeder.

More than one type of circuit arrangement might be adopted to provide this false signal. Circuit arrangements suitable for the false production of signals such as indicated in block diagram form at 127 in FIG. 6 are shown in U.S. Pat. No. 3,126,268, issued Mar. 24, 1964, to C. L. Roberson. Such circuits comprise means for supplying programmed auxiliary signals to the control means for the heating of the molten body in the feeder 11 for variation of the temperature of the molten body in the feeder means at a rate matched to variations in the rate of attenuation of the streams in response to the package buildup. As illustrated in the cited U.S. patent, above, such a circuit may be a vacuum tube circuit which prolongs the charge characteristics of a resistance-capacitor circuit to provide a ramp-function or gradually increasing direct-current signal arranged to oppose the thermocouple signal. The ramp-function signal is preferably initiated responsive to closure of a switch 128 which is suitably associated with the winding apparatus for actuation when the winder begins a package winding cycle. The switch may be conveniently associated with the winder traverse mechanism to operate in this manner. The switch 128 can also be readily arranged to be opened automatically and the winding apparatus stopped automatically when the package is built to full size such as may be determined by winding for a given period, thus completing a packaging cycle.

In view of the minute diameters of fibers being attained with new processes, it is highly desirable to be able to check whether or not the temperature of the molten body is responding correctly to the ramp-function being provided by the unit 127. In order to accomplish this, there is provided a means for sensing the temperature of the molten body and generating a frequency signal in which the frequency signal varies in proportion to the variation of the temperature being sensed. In FIG. 6, this is accomplished by providing a frequency generating or oscillator circuit 140 which includes temperature sensitive components such as crystals 141 and 142. One of the temperature sensitive components 142 may be thermally isolated or held at a predetermined fixed temperature. The other temperature sensitive component 141 is disposed in heat sensing relationship with the molten body held in feeder 11. Because of the differences in temperature, the components 141 and 142 will generate or pass different frequencies. A comparison or differential circuit 143 is utilized to compare these frequencies and to provide an output to a frequency measuring unit 144 which is variable in proportion to the variation of the temperature of the molten body.

The frequency measuring unit 144 includes means for measuring the frequency such as illustrated in FIG. 4 and provides an output to a comparing circuit 145. The comparing circuit 145 also receives an input from a preselected standard 146. This preselected standard may be in the form of a count of a frequency, or in comparable form to the input received by the comparing circuit 145 from the frequency measuring unit 144. The preselected standard unit 146 is preferably stepped in time according to the portion of the packaging cycle being measured. This may be accomplished by reference to or connection with the regulating unit 129. Alternatively, the switching means 128 may be utilized to connect the preselected standard unit 146 to be operative to provide a successive series of standards comparable to that portion of the cycle being measured. A clock timer may hold the operation of the standard unit 146 in step with the packaging cycle. As a further alternative, the preselected standard unit 146 may provide an input to the comparing circuits 145 from a computer memory which is programmed to supply the standards in accordance with the time elapsed of the packaging cycle being sensed.

The comparing circuit 145 compares the signals received from the frequency measuring unit 144 and the preselected standard unit 146. If there is a variation from the standard, a corrective signal is applied from the comparing circuit 145 to the control circuit. As shown in FIG. 6, this corrective signal may be connected to the false temperature signal being supplied to the unit 129. Other suitable connections may also be made in correcting the programmed auxiliary signals in accordance with the difference between the preselected standard and the actual results of the control means at that time.

Thus, it can be seen that extremely close control can be accorded to the production of fibers. This is particularly important since the size of the fibers produced are now in diameters of a range very, very close to the minimum diameter attainable. That is, if the temperature of the molten material in the feeder 11 or the speed of the attenuating means is varied a small degree past the tolerance limits set by the controls when producing fibers of a minimum diameter, the result may be "break outs" of the fiber producing apparatus causing shut downs and loss of production. Therefore, it is extremely important that such variable conditions in the production of fibers be very closely controlled. Even though closely controlled, the variable conditions may be caused to vary by supply line surges, changes in ambient temperature conditions, etc.

Figure 7:
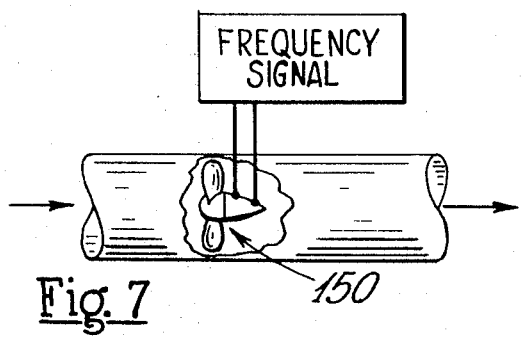
FIG. 7 illustrates variable condition measuring apparatus of this invention as applied to fluid flow.

Referring to FIG. 7, there is illustrated another embodiment of the condition sensing and controlling apparatus of this invention which comprises means for sensing a fluid flow variable condition. The apparatus of FIG. 7 includes means operative to be driven by the fluid flow to produce a frequency signal in which the frequency of the signal varies in proportion to the rate of flow of the fluid. Such fluid flow responsive means may be a propeller or turbine means 150. The propeller or turbine means 150 may be mechanically or electrically linked with a means for producing a frequency signal. Further, the propeller or turbine movement may be sensed by vibration sensitive means which will translate the signal received into a frequency signal proportional to the flow of fluid.

Figure 8:
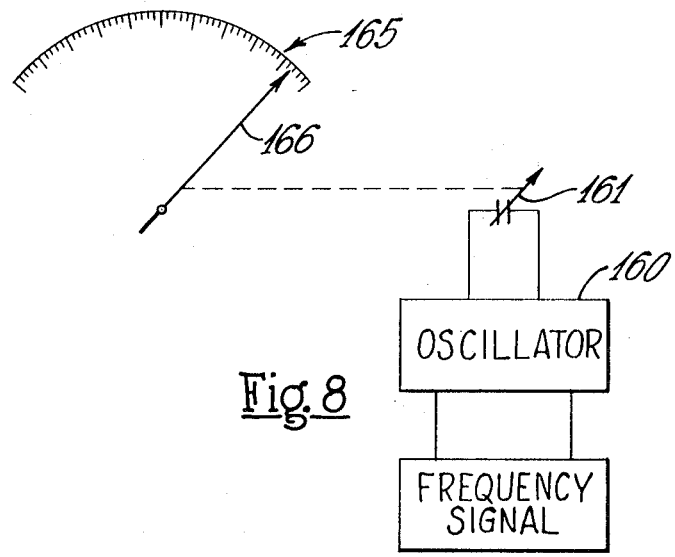
FIG. 8 illustrates variable condition measuring apparatus of this invention as applied to particle flow.

Referring to FIG. 8, there is shown apparatus in which the variable condition being measured is particle flow. The sensing and generating means in this instance includes a frequency generator 160 having an adjustable component 161, which may be in this instance an adjustable capacitor or an adjustable inductance in an oscillator circuit, for varying the frequency output. The means responsive to particle flow in this instance may include weighing means 165 having an indicating means 166. The indicating means 166 may be linked to adjust the adjustable component 161 to vary the frequency signal output from the unit 160 in proportion to the particle flow. The weighing means 165 may be responsive to the weight of particles flowing or being moved along a conveyor having a weighing section.

Figure 9:
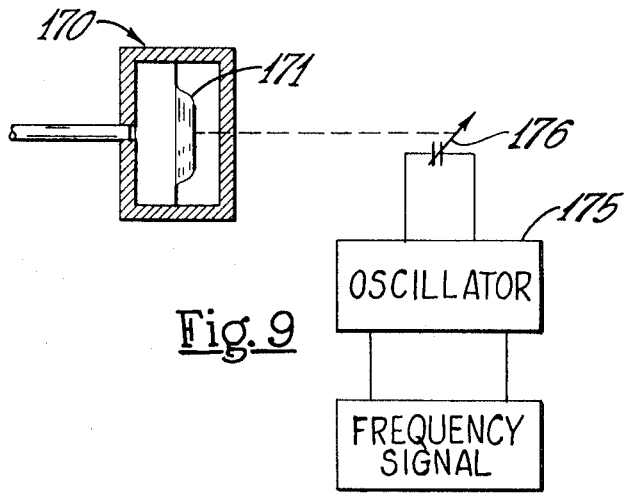
FIG. 9 illustrates variable condition sensing apparatus as applied to the measurement of pressure.

Referring to FIG. 9, there is illustrated apparatus in which the variable condition being measured is pressure, and in which the sensing and generating means includes means 170 for sensing the pressure being measured and includes an indicating means such as a movable diaphragm 171. Again a frequency generating means 175 may be utilized having an adjustable component 176, which may be an adjustable capacitor or inductance in an oscillator circuit, responsive to the indicating means 171 for varying the output frequency of the generating means 175. The diaphragm means may be mechanically linked to the adjustable component 176.

Although direct linkages have been shown in FIGS. 7, 8 and 9, it is to be noted that various optical and other indicating systems which are infinitely more sensitive to minute variations may be utilized to control the output of the frequency generating means. If a mechanical linkage is not sufficiently refined to record minute variations and cause the variation in frequency output desired, optical or light systems may be utilized which effect the output or performance of light sensitive components, including many in the transistor field today, to produce the desired minute variations.

In FIGS. 7 to 9 the frequency signal produced may be measured by the apparatus disclosed hereinbefore to provide measurement of the variable condition. The measurement of the variable condition may be used to alter the condition directly or to alter a programmed auxiliary signal which is controlling the variable condition.

In conclusion, it should be noted that variations to the apparatus taught in this invention may be made to attain the desired results. However, the embodiments disclosed and described herein are meant to be illustrative only and not limiting in any sense. The embodiments described serve merely to illustrate the spirit and scope of the invention.

I claim:

1. Fiber producing apparatus comprising in combination feeder means for containing a molten body of thermoplastic material, means for heating a molten body in said feeder means, control means for said heating means, rotary winder means for attenuating streams of molten material from said feeder into continuous fibers and for winding said fibers into a package, a temperature measuring device included in said control means arranged to supply signals to regulate said heating means for maintenance of a given temperature of a molten body in said feeder means, means for supplying programmed auxiliary signals to said control means for variation of the temperature of a molten body in said feeder means at a rate matched to variations in the rate of attenuation of said streams in response to package build up, means for sensing the temperature of said molten body and generating a frequency signal in which the frequency of the signal varies in proportion to the variation of the temperature being sensed, means for selecting a predetermined period of the frequency signal, counter means responsive to said selecting means adapted to count at a predetermined frequency during said selected period, said counting frequency being higher than the frequency of the signal frequency being measured, means for comparing the measured frequency count with a preselected standard, and means responsive to said comparing means for effecting correction of said control means.

2. Apparatus for producing glass fibers comprising in combination feeder means for receiving a body of molten glass and forming streams of glass for attenuation into fibers, means for heating said body of glass before stream formation, control means for said heating means, means for attenuating said streams into fibers, said control means including temperature measuring means for supplying signals to regulate said heating means for maintenance of said molten body at a preselected temperature, means for supplying programmed auxiliary signals to said control means for variation of the temperature of said molten body at a rate matched to variation in the rate of attenuation, means for sensing the temperature of said molten body and generating a frequency signal in which the frequency of the signal varies in response to the variation of the temperature being sensed, means for selecting a predetermined period of the frequency signal, counter means responsive to said selecting means adapted to count at a predetermined frequency during said selected period, said counting frequency being higher than the frequency of the signal frequency being measured, means for comparing the measured frequency count with a preselected standard, and means responsive to said comparing means for effecting correction of said control means.

3. Aparatus for producing glass fibers comprising feeder means for receiving a body of molten glass and forming streams of glass for attenuation into fibers; means for heating said body of glass before stream formation; and control means for said heating means including means for generating a frequency signal which is variable in proportion to the variation of the temperature of the molten glass, means for selecting a known portion of the cyclic variation of said temperature frequency signal, counter means responsive to said known portion selecting means for counting at a predetermined frequency during said selected known period to provide a measure of the temperature of said glass, the counting frequency being higher than said temperature frequency signal, and means responsive to said counter means for regulating the amount of heat supplied to said glass.

References Cited

UNITED STATES PATENTS

| | | | |
|---|---|---|---|
| 3,047,647 | 7/1962 | Harkins et al. | 65—11W |
| 3,265,476 | 8/1966 | Roberson | 65—1 |
| 3,308,291 | 3/1967 | Kruse | 324—79D |
| 3,471,278 | 10/1969 | Griem | 65—2 |

S. LEON BASHORE, Primary Examiner

R. L. LINDSAY, Jr., Assistant Examiner

U.S. Cl. X.R.

13—6; 18—8; 65—2, 12, 136; 73—359; 324—79; 328—3, 89, 134; 340—171